United States Patent [19]
Ward et al.

[11] Patent Number: 5,139,294
[45] Date of Patent: Aug. 18, 1992

[54] LATCH BEARING FOR BLOW-MOLDED CASE, AND METHOD AND APPARATUS FOR FORMING SAME

[75] Inventors: William W. Ward, Clayton; Andrew E. Dembicks, Raleigh, both of N.C.

[73] Assignee: Southern Case, Inc., Raleigh, N.C.

[21] Appl. No.: 692,309

[22] Filed: Apr. 26, 1991

[51] Int. Cl.⁵ .................. E05C 19/06; B65D 45/16
[52] U.S. Cl. ........................ 292/246; 292/DIG. 38; 403/224; 403/267; 425/522
[58] Field of Search .............. 292/DIG. 38, 246; 425/522, 525, 533; 403/224, 267, 161

[56] References Cited

U.S. PATENT DOCUMENTS

| | | | |
|---|---|---|---|
| 205,335 | 6/1878 | Arnold | 292/246 |
| 1,188,078 | 6/1916 | Jones | 264/250 |
| 1,545,955 | 7/1925 | Goertz. | |
| 2,304,340 | 12/1942 | Dahlin | 18/59 |
| 2,464,524 | 3/1949 | Nathan | 18/59 |
| 2,577,350 | 12/1951 | Morin | 18/55 |
| 2,819,494 | 1/1958 | Morin | 18/55 |
| 3,443,005 | 5/1969 | Braun | 264/245 |
| 3,456,913 | 7/1969 | Lutz | 249/63 |
| 3,490,805 | 1/1970 | Di Pierro et al. | 292/258 |
| 3,575,949 | 4/1971 | Humphrey | 425/522 X |
| 3,730,576 | 5/1973 | Schurman | 292/246 |
| 3,785,217 | 1/1974 | Peura | 74/230.3 |
| 3,828,969 | 8/1974 | Schurman | 220/315 |
| 4,023,840 | 5/1977 | Souza et al. | 292/DIG. 38 X |
| 4,244,612 | 1/1981 | Schurman | 292/249 |
| 4,392,503 | 7/1983 | Watanabe | 292/DIG. 38 X |
| 4,522,312 | 6/1985 | Rathgeber et al. | 292/DIG. 53 X |
| 4,680,837 | 7/1987 | Rubinstein | 24/237 |
| 4,744,445 | 5/1988 | Anderson et al. | 190/107 |
| 4,784,817 | 11/1988 | Towns et al. | 264/219 |
| 4,917,413 | 4/1990 | Jason et al. | 292/76 |
| 5,033,778 | 7/1991 | Niles et al. | 292/DIG. 38 X |

FOREIGN PATENT DOCUMENTS

0002443 10/1978 European Pat. Off. .
614010 10/1979 Switzerland .

*Primary Examiner*—Richard E. Moore
*Attorney, Agent, or Firm*—Bell, Seltzer, Park & Gibson

[57] ABSTRACT

A latch member of a case or similar container blow-molded from thermoplastic material is pivotally and permanently secured to the case by a bearing formed substantially simultaneously with and from the same thermoplastic material as the body of the case. Formation of a permanent bond between the bearing member and the latch member is avoided by employing a latch member formed of material having a higher melt temperature than the material used in the formation of the main body of the case and the bearing member, and also by effecting relative movement between the latch member and the bearing member while the thermoplastic material forming the bearing member is still in a heated condition. Apparatuses for positioning the latch member within the mold are also disclosed.

33 Claims, 6 Drawing Sheets fig. 1.

LATCH BEARING FOR BLOW-MOLDED CASE, AND METHOD AND APPARATUS FOR FORMING SAME

FIELD OF THE INVENTION

This invention relates to cases and similar articles that are blow-molded from thermoplastic material and include relatively movable base and cover components that are releasably secured together by one or more latch assemblies. The invention more specifically relates to an improved bearing for a latch assembly of the aforesaid type, and to a method and apparatus for forming the bearing and case.

BACKGROUND OF THE INVENTION

The latch assemblies of blow-molded plastic cases customarily each include a preformed latch member which is secured adjacent one end to one of the base and cover components of the case, and that has a latch element adjacent its opposite end which is movable into and out of latching engagement with a lug or other retaining element upon the other one of the case components. The latch member's capability for movement between latched and unlatched positions has heretofore been realized in one of two different ways. One of these, disclosed in U.S. Pat. No. 3,828,969, is to employ a flexible latch member that bends so as to permit movement of its free end between latched and unlatched positions. An alternative technique disclosed in U.S. Pat. No. 4,522,312 employs a substantially rigid latch member having a pivot element that is snapped into a discontinuous or "split" bearing of the case.

The prior art latch assemblies of both of the aforesaid types have significant disadvantages. The flexible latch members do not provide a solid "feel," and also tend to automatically reassume their "latched" positions, when released. This can be quite annoying, particularly when the case has a plurality of latches that must all be held in their disengaged positions before the case can be opened. The rigid latch members unfortunately can be "snapped" out of, as well as into, their associated split bearings. A substantial number of cases having snap-in latch members are returned by retailers each year to case manufacturers due to loss of their latch members from the cases. Additionally, the cost of manufacturing cases with latch assemblies of either of the foregoing types is increased due to the need for a separate latch-attaching operation subsequent to blow-molding of the cases.

SUMMARY OF THE INVENTION

The latch assembly of the present invention is free from the disadvantages and deficiencies of the above-discussed prior art ones now employed in association with blow-molded plastic cases. The present latch assembly includes a latch member which is preferably and illustratively substantially rigid. The latch member undergoes pivotal movement about a pivot element adjacent one end thereof. The pivot element is mounted for pivotal movement by an encircling bearing member that is molded substantially simultaneously with and preferably from the same thermoplastic material as the main body of the case component to which the bearing is connected. The invention further provides a method for effecting pivotal mounting of the latch, and for preventing formation of a permanent bond between its pivot element and the bearing member. In another of its aspects, the invention provides apparatus for positioning the preferred latch member at a desired location within a mold during molding of the latch bearing member and the main body of the case component supporting the bearing. In addition to other functions, the apparatus preferably causes relative pivotal movement to occur between the bearing member and the pivot element of the latch member while the thermoplastic material of the bearing member is still in a heated condition. Preferably the aforesaid pivotal movement transpires automatically in response to opening of the mold within which the case component and the bearing are formed.

DESCRIPTION OF THE DRAWINGS

Other features of the invention will be apparent from the following description of preferred embodiments thereof, which should be read in conjunction with the accompanying drawings, in which.

DESCRIPTION OF THE PREFERRED EMBODIMENTS

Figure 1:
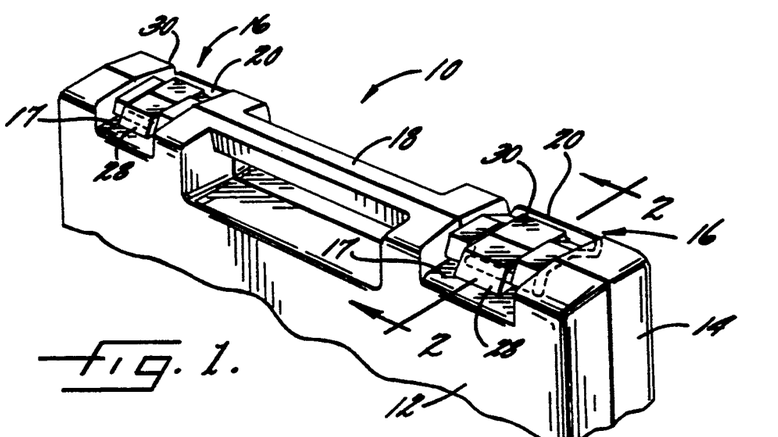
FIG. 1 is a fragmentary view of the upper portion of an upright double-wall, blow-molded case having relatively movable base and cover components, and latch assemblies for releasably maintaining such components in a closed condition.

The numeral 10 in FIG. 1 designates a double-wall case blow-molded from suitable thermoplastic material, such as polyethylene. Case 10 has complementary base and cover components 12, 14 that are pivotally or otherwise movable relative to each other between a closed position, shown in FIG. 1 and wherein confronting upper portions of components 12, 14 abut each other; and an open position (not shown) wherein such portions are spaced from each other.

Figure 2:
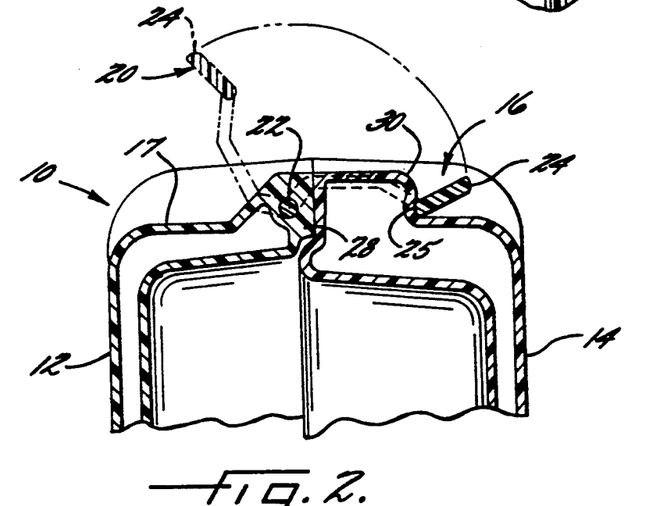
FIG. 2 is an enlarged vertical section taken substantially along the line and in the direction of the arrows 2—2 of FIG. 1 through one of the latch assemblies and adjacent walls of the case of FIG. 1.
Figure 3:
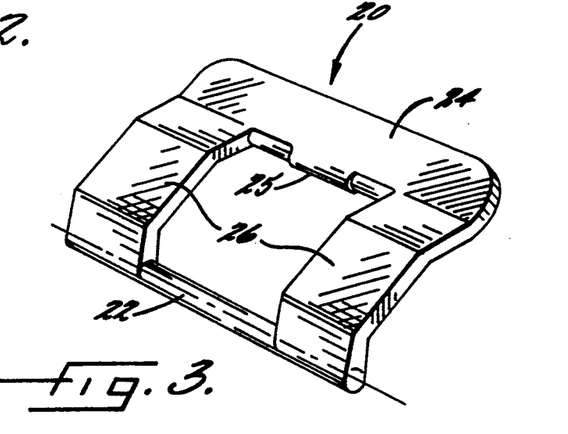
FIG. 3 is an enlarged perspective view of the latch member used in the latch assemblies.

Case components 12, 14 are releasably maintained in their closed position by at least one, and illustratively two, latch assemblies 16 located upon the upper (as viewed in FIGS. 1 and 2) walls 17 of case 10 adjacent opposite ends of an optional carrying handle 18. Each latch assembly 16 includes a substantially rigid latch member 20, best shown in FIG. 3 of the drawings. Latch member 20 has an elongate shaft-like pivot element 22 adjacent one end thereof, a latch element 24 adjacent its opposite end, and a pair of laterally spaced opposite side elements 26 interconnecting pivot and latch elements 22, 24. The latch member preferably and illustratively has an angular nonplanar shape which enhances its rigidity and facilitates manipulation of the latch by a person grasping its latch element 24. Element 24 preferably and illustratively has a tab element 25 upon the edge thereof facing pivot element 22.

Each latch assembly 16 also includes a bearing member 28 that extends upwardly from and is integral with the upper (as viewed in FIGS. 1 and 2) wall 17 of one of the case components 12, 14, illustratively base component 12; and further includes a latch keeper member 30 that extends upwardly from and is integral with the adjacent upper wall 17 of the other case component 14.

The bearing member 28 of each latch assembly preferably and illustratively encircles the entire circumference of pivot element 22 of the associated latch member 20, and extends along substantially the entire length of the pivot element. Bearing member 28 permanently secures pivot element 22 and the rest of latch member 20 to case component 12 while permitting free pivotal movement of the latch member between a latched position and an unlatched position. In the latched position of member 20, illustrated by solid lines in FIGS. 1 and 2, engagement between latch element 24 and latch keeper 30 maintains case 10 closed. When member 20 occupies an unlatched position, such as that illustrated by phantom lines in FIG. 2, latch element 24 is out of engagement with latch keeper 30 and therefore does not impede "opening" movement of case components 12, 14 away from each other.

Figure 4:
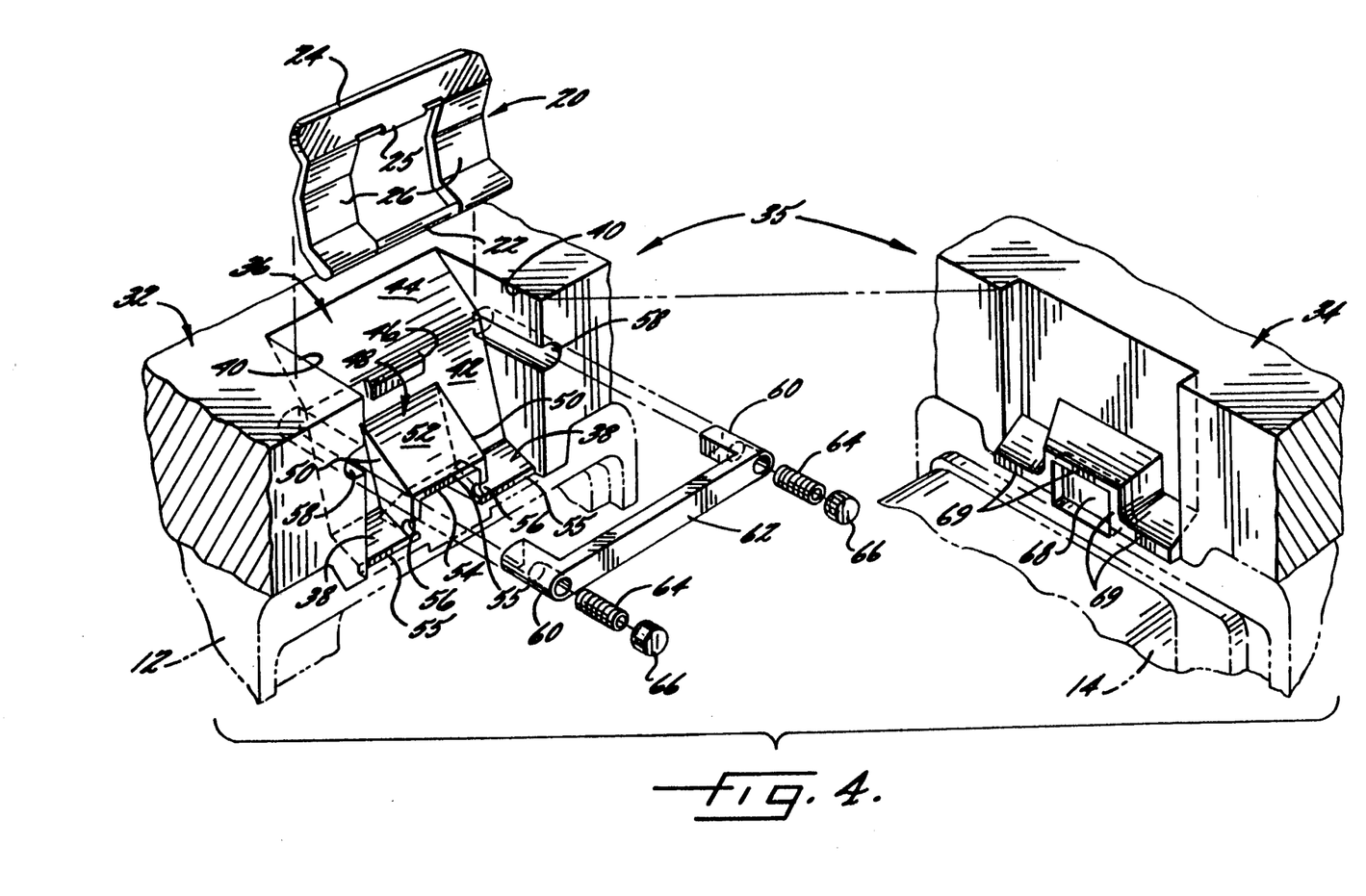
FIG. 4 is an exploded and rotated perspective view of confronting areas of relatively movable cavity and core sections of a split mold for forming a latch bearing member integrally and substantially simultaneously with one of the base/cover components of the case; and of a fixture for positioning a preformed latch member at a desired location within the mold during molding of the case component and of the bearing member.

The bearing member 28 of each latch assembly 16 is formed about pivot element 22 of the latch member 20 of the assembly. Member 28 is formed during blow-molding of the case component 12 with which the bearing member is illustratively associated, and of the same thermoplastic material as is used for the formation of the main body of case component 12. FIG. 4 of the drawings shows confronting portions of the cavity and core sections 32, 34 of a mold 35 that has been modified so as to produce the foregoing results. Core section 32 has a seat 36 that receives the preformed latch member 20, and maintains it in a desired position during the molding operation. Seat 36 has sloping bottom walls 38, opposite side walls 40, a sloping rear wall 42, and a sloping (as shown) or horizontal entry wall 44. A pad 46 projects from the upper center portion of rear wall 42. A chamber 48 below pad 46 has opposite side walls 50 that extend forwardly from rear wall 42 and upwardly from bottom wall 38, and has a sloping top wall 52. A recess 54 within the chamber's front lower portion opens from the forward and bottom edge surfaces 55 of the chamber, and is bordered by forwardly disposed barrier edge surfaces 55. The front lower portions of the side walls 50 of chamber 48 contain arcuate recesses 56. Channels 58 within opposite side walls 40 of seat 36 slidably receive the legs 60 of a generally U-shaped latch biasing member 62. Member 62 is biased toward pad 46 by resiliently extensible and compressible members 64, which are illustratively coil springs. One end of each spring 64 engages and is seated within the associated leg 60 of member 62. The opposite ends of the springs engage cap elements 66 that are secured within the forward end portions of channels 58.

Figures 5, 6:
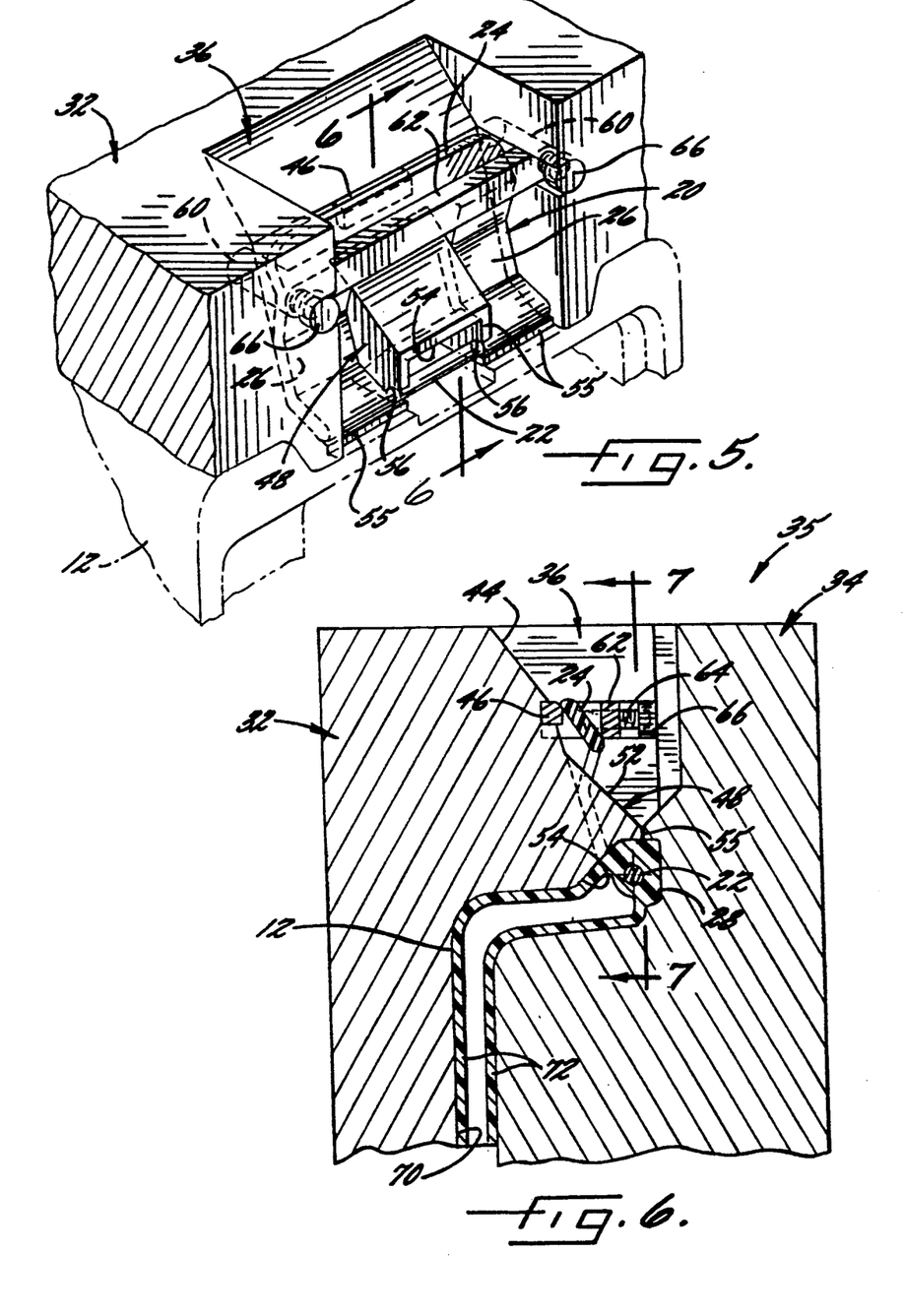
FIG. 5 is a view similar to that of the leftward part of FIG. 4, but showing the latch and fixture members in the positions which they occupy during a molding operation.
FIG. 6 is a vertical sectional view taken substantially along the line and in the direction of the arrow 6—6 of FIG. 5.
Figure 7:
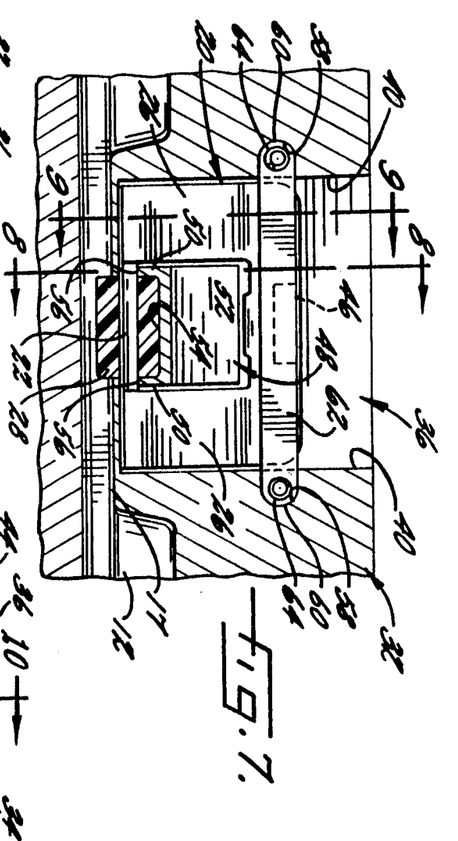
FIG. 7 is a vertical sectional view taken substantially along the line and in the direction of the arrows 7—7 of FIG. 6.

FIG. 5 of the drawings shows the position occupied by latch member 20 after downward movement from its position of FIG. 4 into a position of seated engagement with seat 36 of cavity mold section 32. Opposite side elements 26 of latch member 20 closely straddle opposite sides 50 of chamber 48, and overlie bottom walls 38 and rear wall 42. Pivot element 22 of latch member 20 extends across the front of chamber 48 and its opposite ends are received within the recesses 56 in the chamber side walls 50. Latch element 24 of member 20 overlies pad 46, and is biased into engagement with the pad by latch biasing member 62 and the therewith associated biasing springs 64. During movement of latch member 20 into mold seat 36, member 62 is cammed away from pad 46, against the biasing force of springs 64, to permit passage of the lower components of latch member 20 by member 62.

Figure 8:
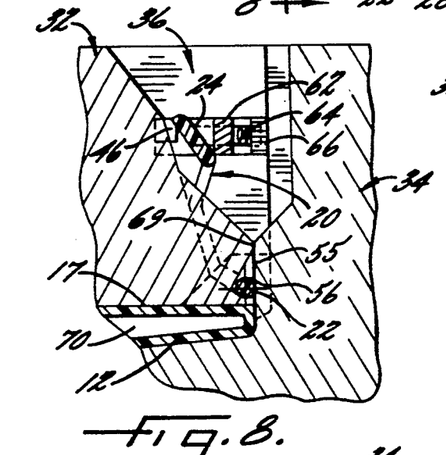
FIG. 8 is a vertical section taken substantially along the lines and in the direction of the arrows 8—8 of FIG. 7.
Figure 9:
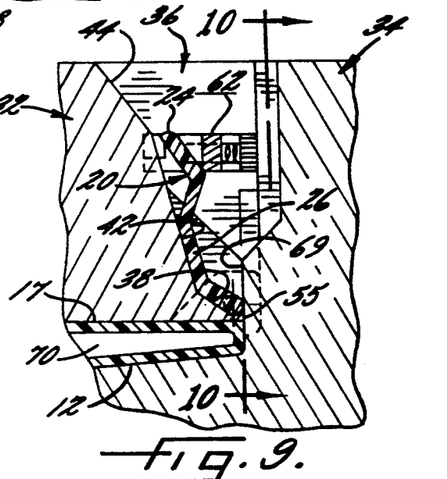
FIG. 9 is a vertical section taken substantially along the line and in the direction of the arrows 9—9 of FIG. 7.
Figures 10, 11:
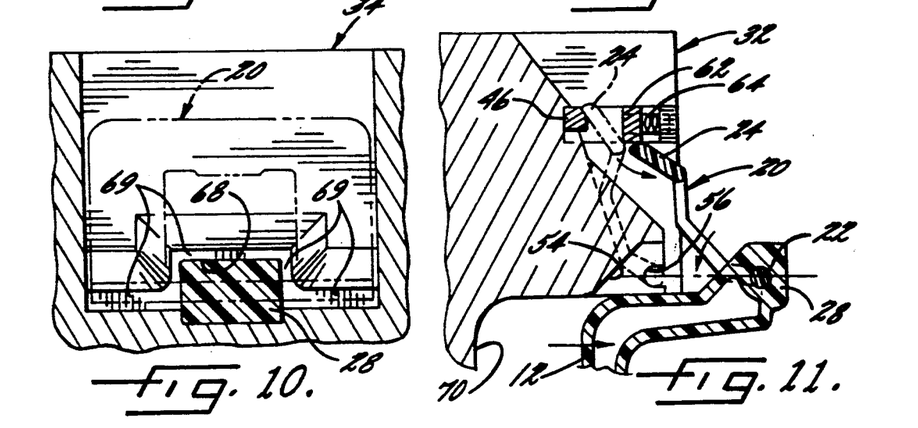
FIG. 10 is a vertical section taken substantially along the line and in the direction of the arrows 10—10 of FIG. 9.
FIG. 11 is a sectional view showing in phantom lines the position occupied by the latch during the molding operation, and showing by solid lines movement undergone by the latch member as the mold opens following the molding operation.

Core half 34 of mold 35 includes a recessed area 68 which in the closed condition of the mold forms a forwardly disposed extension of chamber 48 of mold section 32. Area 68 is bordered by projecting barrier edges 69 that in the closed condition of mold 35 engage the forward edge surfaces 55 of chamber 48 and the thereto adjacent portions of bottom wall 38 of seat 36 of mold section 32. As shown in FIGS. 8 and 9, the resulting extended chamber 48 contains pivot element 22 of latch 20, and communicates, via its open bottom and as is best shown in FIG. 6, with the underlying space 70 containing the heated thermoplastic parison material 72 from which the body of case section 12 is formed. Although prevented by abutting edge surfaces 55 and 69 of mold sections 32, 34 from entering other areas of latch seat 36, the heated thermoplastic material from space 70 can and does pass upwardly into the extended chamber 48, and forms the bearing 28 which extends completely about pivot element of latch member 20 and along substantially the entire length of the pivot element. The bearing member 28 is formed substantially simultaneously with formation of the adjacent portion of the upper (as viewed in FIG. 1) wall 17 of case section 12, and is integral with such wall section. The sectional view of FIG. 6 shows bearing 28 immediately following formation of it and the adjacent part of the body of case component 12. Subsequent to formation of the foregoing case and bearing components, and when such components are in a solid but still heated condition, the cavity and core sections 32, 34 of mold 35 are moved in a conventional manner away from each other. During this "opening" movement of the mold the case component 12 carrying latch bearings 28 and latch members 20 adheres to core section 34, and moves with it away from mold cavity section 32. The pivot element 22 of each latch member 20 moves in substantial unison with case component 12 away from cavity section 32 of the mold. However, as shown in FIG. 11 during the initial part of such movement, the resilient biasing force imposed upon each latch element 24 of the latch member, by the associated biasing member 62, causes a few degrees of relative pivotal movement to occur between pivot element 22 and bearing member 28. Such relative movement prevents or overcomes whatever temporary surface bond might otherwise form between bearing 28 and pivot element 22 of latch member 20, such that latch member 20 can undergo unimpeded pivotal movement about an axis extending through its pivot element 22. To further insure against a permanent bond being formed when latch member 20 is formed of thermoplastic or other heat-sensitive material, such material of the latch member should preferably have a melt temperature (or, in the case of a pre-molded plastic, a heat transition temperature) greater than the maximum temperature to which it is exposed during the molding of bearing member 28 and case component 12.

Following the aforesaid initial pivotal movement that occurs between bearing member 28 and pivot element 22 of latch 20, the latch member is permitted by the resilient mounting of member 62 to move in unison with case component 12 from mold section 32.

Figure 12:
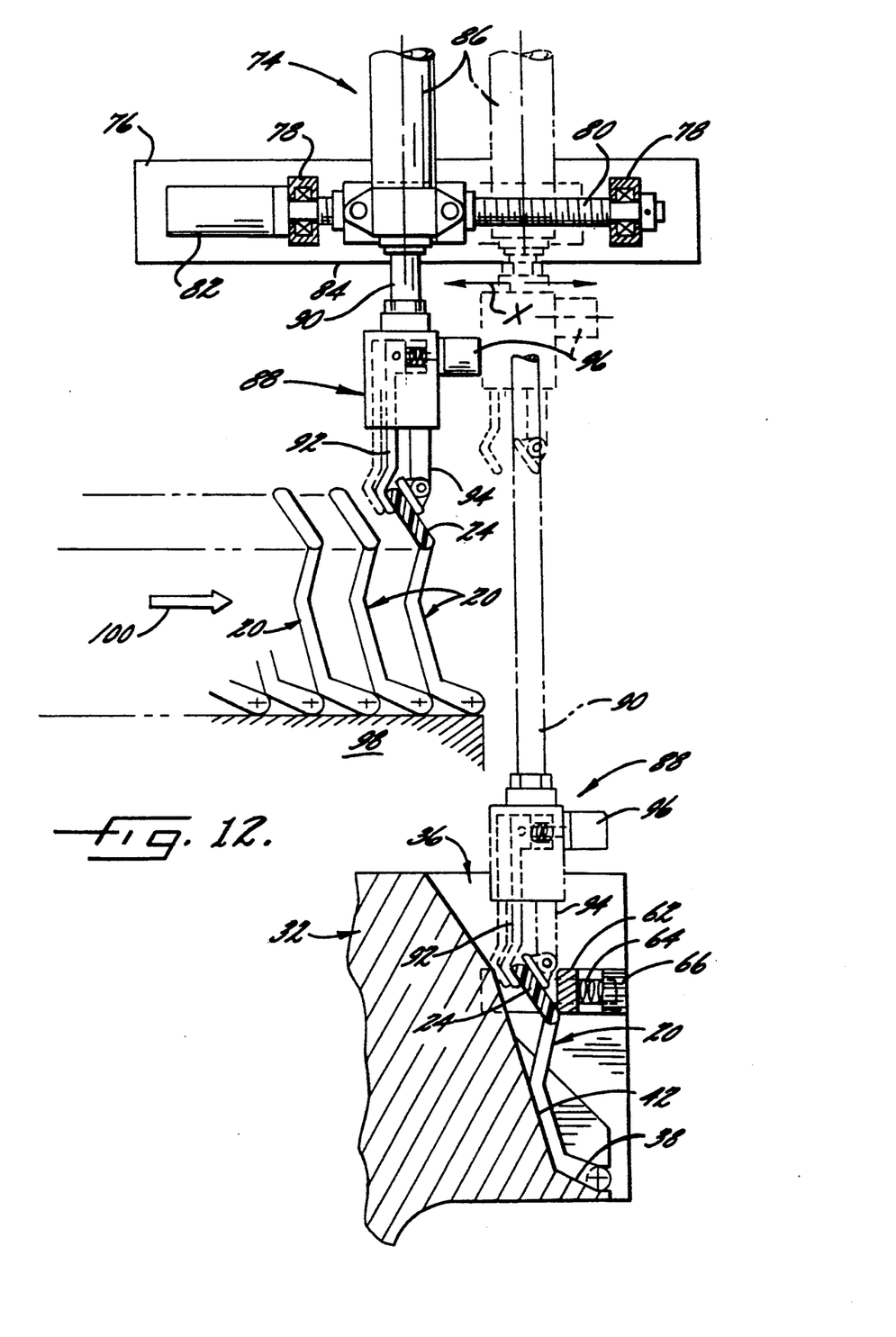
FIG. 12 is a side elevational view of an alternative embodiment wherein a robotic apparatus positions the latch members within the mold.

FIG. 12 of the drawings illustrates an alternative embodiment wherein the positioning of each latch member 20 within mold section 32 is accomplished by means of a robotic apparatus 74, rather than manually. Apparatus 74 includes a base 76 having bearings 78 mounting a generally horizontally extending threaded shaft member 80 for reversible rotative movement about its central axis under the impetus of a drive motor 82. Shaft 80 supports a traveling nut 84 and rotation of screw 80 imparts horizontal or X-axis movement to the nut 84 and to a generally vertically extending piston and cylinder assembly 86 affixed to it. Assembly 86 imparts controlled upward and downward movement of desired magnitudes to a gripper mechanism 88 upon the lower end of the rod 90 of assembly 86. Gripper mechanism 88 includes a pair of gripper elements 92, 94 and a piston and cylinder assembly 96 for moving the gripper elements horizontally toward and away from each other. Apparatus 74 also includes a magazine 98 containing a supply of latch members 20 and a spring, piston and cylinder assembly or other mechanism (not shown) for advancing the latch members sequentially in the direction of the arrow 100 to a pick-up position adjacent the rightmost end of magazine 98.

Prior to the commencement of each molding operation, gripper mechanism 88 is moved downwardly by piston and cylinder assembly 86, and piston and cylinder assembly 96 causes gripper elements 92, 94 to move toward each other and to grippingly engage the latch element 24 of the latch member 20 in the pickup position of magazine 98. This is indicated in solid lines in the upper portion of FIG. 12. Drive motor 82 and screw 80 then move gripper mechanism 88 and the thereby gripped latch member 20 horizontally to the right (as viewed in FIG. 12) to a position wherein they overlie the latch seat 36 within cavity section 32 of the mold. Extension of piston and cylinder assembly 86 then moves mechanism 88 and the gripped latch member 20 vertically downwardly to their positions illustrated in the lower part of FIG. 12, and wherein latch member 20 is seated by seat 36 of cavity mold section 32, and is resiliently retained by latch biasing member 62. Gripper mechanism 88 may then release latch member 20 and be moved upwardly by piston and cylinder 86 to its upper phantom line position, in readiness for another cycle of operation. Alternatively, after gripper mechanism 88 has positioned latch member 20 within recess 36 of cavity mold section 32, the gripper mechanism may remain in its lowermost position and continue to engage latch member 20 until such time as the molding operation has been completed and initial relative movement of cavity and core sections 32, 34 of mold 35 away from each other has effected the desired limited pivotal movement between latch element 22 and the encircling bearing member 28. When gripper mechanism 88 performs the foregoing latch retaining function, as well as its latch member "loading" function, latch biasing member 62 and its associated springs 64 and caps 66 may not be needed or employed.

Figures 13, 14, 15:
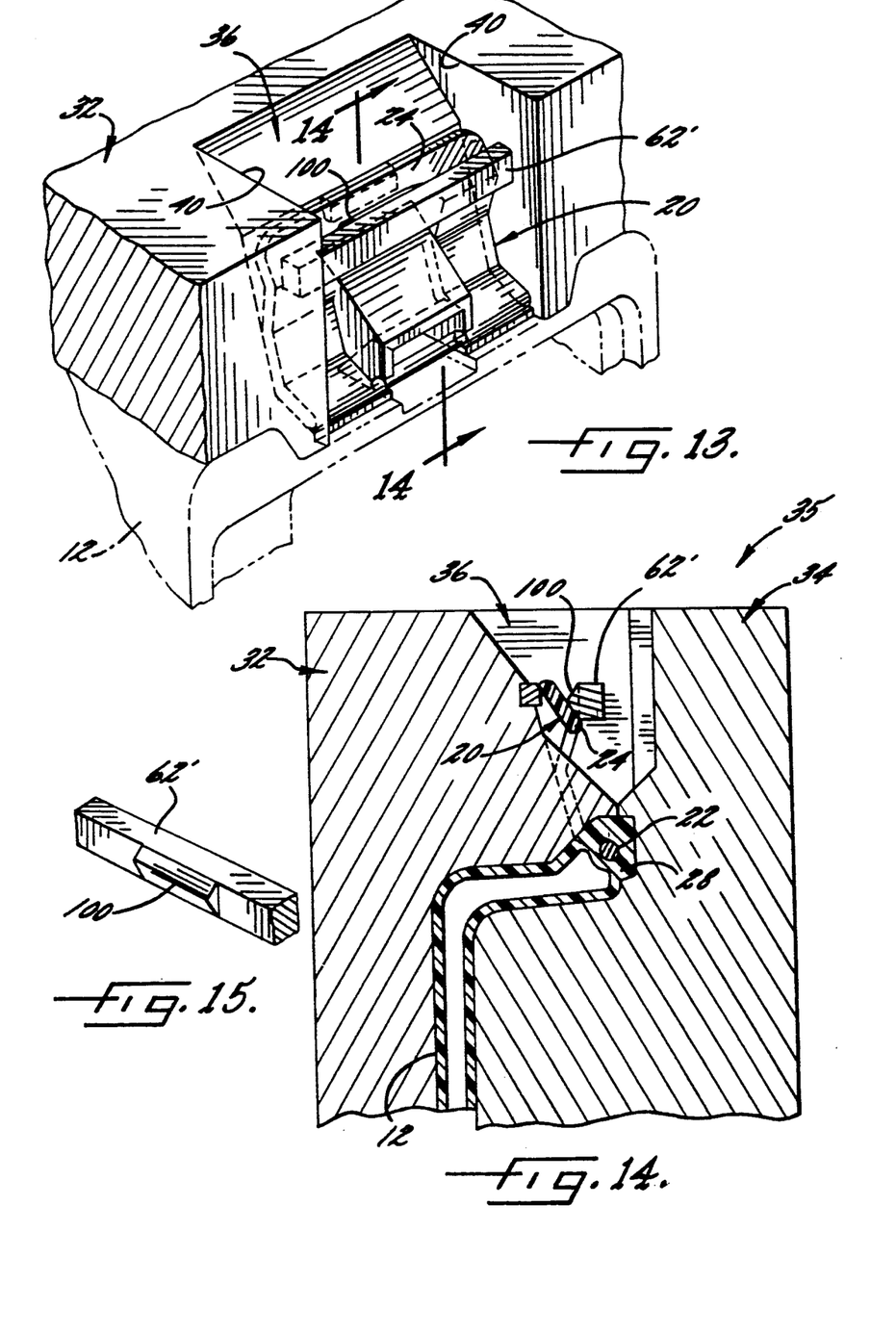
FIG. 13 is a view similar to FIG. 5 but showing an alternative construction of the latch biasing member.
FIG. 14 is a view similar to FIG. 6 but showing the alternative biasing member.
FIG. 15 is a fragmentary rear perspective view of the central portion of the alternative latch biasing member.

FIGS. 13–15 show other embodiments wherein the springs 64 associated with member 62 of the FIGS. 1–12 embodiments are not needed or employed. Opposite ends of the biasing member 62' of FIGS. 13–15 are fixedly connected or integral with the side walls 40 of mold seat 36. The central part of member 62' has a rearwardly extending pad 100 thereon. In one embodiment member 62' is made of resiliently flexible metallic or other material. As a latch member 20 is moved onto seat 36, engagement between pad 100 and the latch member deflects the central portion of biasing member 62' sufficiently forwardly as to not impede seating movement of the latch member. The tendency of the deflected member 62' to return to its non-deflected position subjects the seated latch member to a biasing force that performs the same function as the biasing force generated in the FIGS. 1–12 embodiment by springs 64. The aforesaid function can also be achieved by use of a rigid member 62' when the latch member 20 itself is sufficiently resiliently flexible, since this also will result in imposition of the desired biasing force upon the latch member, due to the tendency of its section 24 to return in a forward direction after having been deflected rearwardly by engagement with the pad 100 upon member 62'.

As will be appreciated from the foregoing description, the present method of pivotally securing a pivot latch element of a latch member to one of the base and cover components of the blow-molded thermoplastic case preferably includes the steps of positioning the pivot element of the latch member at a selected location within the mold, utilizing part of the heated thermoplastic material of the parison introduced into the mold to form the body of the case component and to substantially simultaneously form an integral bearing member that is integral with such body, which encircles the pivot element of the latch member, and permanently secures the latch member to the body of the case component. The method preferably further includes preventing formation of a permanent bond between the pivot element and the bearing member, by, among other things, effecting relative movement between the bearing member and the pivot element of the latch member while the thermoplastic material forming the bearing member is still in heated condition.

Although latch members 20 and their pivot elements 22 illustratively have buckle-like and shaft-like shapes, respectively, they of course might be of other shapes.

While specific embodiments of the invention have been shown and described, this was for purposes of illustration only, and not for purposes of limitation, the scope of the invention being in accordance with the following claims.

We claim:

1. A latch assembly for a case blow-molded from thermoplastic material, said case having relatively movable base and cover components, comprising:
   a latch member having a pivot element adjacent, a first end thereof and a latch element adjacent a second end thereof;
   a latch bearing integral with one of said case components, said bearing being formed substantially simultaneously with and of the same plastic material as the main body of said one of said case components, said latch bearing encircling said pivot element of said latch member and supporting said latch member for pivotal movement between a latched position and an unlatched position; and
   a keeper element upon the other of said case components, said keeper element cooperating at desired times with said latch member to secure said components of said case together.

2. A latch assembly as in claim 1, wherein said latch member is formed at least in part of a material having a melting point greater than the melting point of said material from which said one of said case components is formed.

3. A latch assembly as in claim 1, wherein said latch bearing permanently secures said latch member to said one of said case components.

4. A latch assembly as in claim 1, wherein said pivot element of said latch member is of elongate shaft-like shape, and said latch bearing has an elongate opening receiving and formed by said pivot element.

5. A latch assembly as in claim 4, wherein the relative transverse dimensions of said pivot element and of said opening of said latch bearing are such as to prevent significant transverse movement of said pivot element relative to said latch bearing.

6. A latch assembly as in claim 5, wherein said latch member is formed at least in part of material having a melt temperature greater than the melt temperature of said thermal plastic material.

7. A latch assembly as in claim 6, wherein said latch member is formed at least in part of polypropylene, and at least one of said components of said case is formed of high density polyethylene.

8. A latch assembly as in claim 7, wherein both of said components of said case are formed of said high density polyethylene.

9. A latch assembly as in claim 8, wherein said latch member is substantially rigid, and further includes at least one connecting element interconnecting said pivot element and said latch element of said latch member.

10. A latch assembly as in claim 9, wherein said latch member includes a pair of laterally spaced connecting elements adjacent respective opposite sides of said latch member.

11. A latch assembly for a case blow-molded from thermoplastic material, said case having relatively movable base and cover components, comprising:
   a latch member having a pivot element and a latch element;
   a latch bearing integral with one of said case components, said latch bearing being formed substantially simultaneously with and of the same thermoplastic material as the main body of one of said case components, said latch bearing mounting said latch member for pivotal movement and permanently connecting said latch member to said one of said case components; and
   a latch keeper element upon the other of said case components.

12. A latch assembly as in claim 11, wherein said pivot element of said latch member is of elongate shaft-like shape, and said latch bearing encircles said pivot element and has an elongate opening receiving said pivot element.

13. A latch assembly as in claim 12, wherein said latch member is formed at least in part of material having a melt temperature greater than the melt temperature of said thermoplastic material.

14. A latch assembly as in claim 11, wherein said latch member is formed at least in part of polypropylene, and at least one of said components of said case is formed of high density polyethylene.

15. A latch assembly as in claim 14, wherein said latch member is substantially rigid, and further includes at least one connecting element interconnecting said pivot element and said latch element of said latch member.

16. A latch assembly as in claim 15, wherein said latch member includes a pair of laterally spaced connecting elements adjacent respective opposite sides of latch member.

17. In combination with a split mold for blow-molding from thermoplastic material one component of a double-wall case having relatively movable base and cover components, said one component of said case being adapted to mount a preformed latch member having a pivot element for pivotal movement, the improvement comprising:
   means carried by said mold for positioning said pivot element of said latch member at a preselected location within said mold, and for causing said thermoplastic material to form a bearing element, during formation of said one of said case components and integral therewith, about said pivot element of said latch member.

18. The combination of claim 17, including means for causing said bearing member and said pivot element of said latch member to undergo movement relative to each other during opening of said mold.

19. The combination of claim 18, wherein said means for causing said relative movement causes relative pivotal movement between said bearing member and said pivot element of said latch member.

20. The combination of claim 19, including means upon said mold for minimizing engagement of said thermoplastic material with parts of said latch member other than said pivot element.

21. The combination of claim 17, wherein said means for positioning said pivot element of said latch member includes a member causing a biasing force to be exerted upon said latch member.

22. A method of making a double-wall, blow-molded case from thermoplastic material, and of substantially simultaneously permanently and pivotally securing a preformed latch member to the case, comprising:
   using part of the thermoplastic material to mold the primary part of the case; and forming, from the thermoplastic material and substantially simultaneously with formation of the case, a bearing integral with the case and permanently and pivotally securing the latch member to the case.

23. A case and bearing made in accordance with the method of claim 22, wherein the latch member has a pivot element, and the bearing encircles said pivot element.

24. A method of pivotally securing a pivot element of a latch member to a component of a blow-molded case, having relatively movable base and cover components, during blow-molding of the case in a mold from heated thermoplastic material, comprising:
positioning the pivot element of the latch member at a selected location within the mold;
utilizing part of the heated thermoplastic material introduced into the mold to form the body of the case component and to substantially simultaneously form a bearing member encircling the pivot element of the latch member and integrally connected to the body of the case component.

25. A method as in claim 24, and further including the step of preventing formation of a permanent bond between the pivot element and the bearing member.

26. A method as in claim 24, wherein the step of preventing formation of a permanent bond includes effecting relative movement between the bearing member and the pivot element of the latch member while the thermoplastic material of the bearing member is still in a heated condition.

27. A method as in claim 25, wherein the step of preventing formation of a permanent bond includes effecting relative rotative movement between the pivot element and the bearing while the thermoplastic material of the bearing member is still in a heated condition.

28. A method as in claim 25, wherein the step of preventing formation of a permanent bond includes effecting relative rotative movement between the bearing member and the pivot element of the latch member during opening of the mold.

29. A method as in claim 25, wherein the step of preventing formation of a permanent bond includes effecting relative rotative movement between the bearing member and the pivot element of the latch member during removal of the case component from the mold.

30. A method as in claim 25, wherein the step of preventing the formation of a permanent bond includes forming the bearing member from a material having a melting temperature lower than the melting temperature of the material of the bearing member.

31. A method as in claim 24, wherein the thermoplastic material is high density polyethylene, and the pivot element of the latch member is made of material having a melt temperature greater than that of said polyethylene.

32. A method as in claim 31, and further including the step of minimizing, during molding of the case component and the bearing member, engagement of the thermoplastic material with parts of the latch member other than the pivot element.

33. A method as in claim 32, wherein the step of minimizing engagement includes providing barriers in the mold between the pivot element of the latch member, and other parts of the latch member.

* * * * *